United States Patent [19]

Kikuchi et al.

[11] Patent Number: 5,021,190

[45] Date of Patent: Jun. 4, 1991

[54] FERROELECTRIC LIQUID CRYSTAL COMPOSITION

[75] Inventors: Makoto Kikuchi; Kanetsugu Terashima; Mitsuyoshi Ichihashi; Fusayuki Takeshita, all of Chiba; Kenji Furukawa, Kanagawa, all of Japan

[73] Assignee: Chisso Corporation, Japan

[21] Appl. No.: 408,500

[22] PCT Filed: Jan. 5, 1989

[86] PCT No.: PCT/JP89/00001

§ 371 Date: Aug. 25, 1989.

§ 102(e) Date: Aug. 25, 1989

[87] PCT Pub. No.: WO89/06266

PCT Pub. Date: Jul. 13, 1989

[30] Foreign Application Priority Data

Jan. 5, 1988 [JP] Japan .................................. 63-541

[51] Int. Cl.⁵ .............................................. C09K 19/34
[52] U.S. Cl. ........................ 252/299.61; 252/299.01; 252/299.6; 252/299.66
[58] Field of Search ............ 252/299.01, 299.6, 299.61, 252/299.63, 299.64, 299.65, 299.66, 299.67

[56] References Cited

U.S. PATENT DOCUMENTS

| | | | |
|---|---|---|---|
| 4,533,488 | 8/1985 | Fukui et al. | 252/299.61 |
| 4,668,427 | 5/1987 | Saito et al. | 252/299.66 |
| 4,751,019 | 6/1988 | Saito et al. | 252/299.66 |
| 4,780,241 | 10/1988 | Furukawa et al. | 252/299.63 |
| 4,882,086 | 11/1989 | Terashima et al. | 252/299.61 |
| 4,892,393 | 1/1990 | Terashima et al. | 350/350 S |
| 4,966,727 | 10/1990 | Ichihashi et al. | 252/299.61 |

FOREIGN PATENT DOCUMENTS

| | | |
|---|---|---|
| 61-207486 | 9/1886 | Japan . |
| 61-291679 | 12/1986 | Japan . |
| 63-235393 | 9/1988 | Japan . |
| 63-243048 | 10/1988 | Japan . |
| 63-267763 | 11/1988 | Japan . |
| 63-278993 | 11/1988 | Japan . |
| 64-63571 | 3/1989 | Japan . |

WO86/06401 4/1985 PCT Int'l Appl. .

Primary Examiner—Robert L. Stoll
Assistant Examiner—Greg M. Sweet
Attorney, Agent, or Firm—Leydig, Voit & Mayer

[57] ABSTRACT

The present invention relates to a ferroelectric liquid crystal composition having quick response and comprising a smectic liquid crystal compound and an optically active compound.

The ferroelectric liquid crystal composition comprises components A and B, said component A comprising a compound represented by the formula:

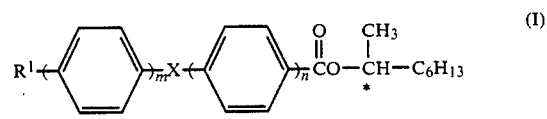

and/or a compound represented by the formula:

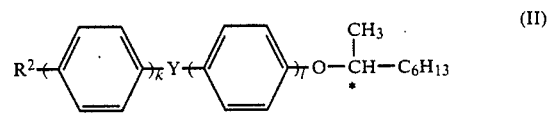

said component B comprising a compound represented by the formula:

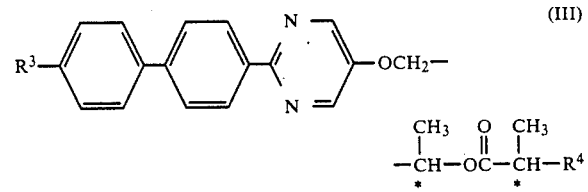

and/or a compound represented by the formula:

(Abstract continued on next page.)

(IV)

wherein $R^1$, $R^2$, $R^3$ and $R^5$ are each an alkyl or alkoxy group of 1 to 18 carbon, $R^4$ and $R^6$ are each an alkyl group of 2 to 18 carbon atoms or an alkoxy group of 1 to 18 carbon atoms, X and Y are each $-CH_2O-$, $-OCH_2-$, m, n, k and l are each an integer of 1 or 2 and * is an asymmetric carbon atom, the component A to component B ratio being 1.5 or less. This ferroelectric liquid crystal composition can be used in a light switching element for the purpose of imparting quick response to the light switching element.

7 Claims, 6 Drawing Sheets

FERROELECTRIC LIQUID CRYSTAL COMPOSITION

TECHNICAL FIELD

The present invention relates to a ferroelectric liquid crystal material. More particularly, the present invention is concerned with a ferroelectric liquid crystal composition having quick response properties and comprising a smectic liquid crystal compound and an optically active compound, and a light switching element using the same.

BACKGROUND ART

Liquid crystal compounds are widely used as a material for display elements. Most of display elements comprising a liquid crystal are used in a TN-type display system, and liquid crystal materials belonging to a nematic phase are used for this purpose.

Since the TN-type display system is a non-emissive display type, it has advantages such as freedom from occurrence of eyestrain and small power consumption, but on the other hand it has drawbacks such as slow response and disappearance of display at certain visual angle. In recent years, said system has been converted so that features in the form a a flat display could be utilized. In particular, quick response and wide visual angle have been demanded.

In order to meet the above demand, an attempt has been made to improve the liquid crystal material. However, the TN display system is considerably inferior to other emissive display element (e.g., electrouminescent display and plasma display) in the response time and width of visual angle. Therefore, development of a novel liquid crystal display system as an alternative of the TN type display system is indispensable to attain a combination of utilization of the features of a liquid crystal display element, such as non-emissive type and small powr consumption, with attainment to response characteristics comparable to those of the emissive display. As one of the attempts, N.A. Clark and S.T. Lagerwall have proposed a display system wherein an optical switching phenomenon of a ferroelectric liquid crystal is utilized [see Appl. Phys. Lett., Vol. 36, p. 899 (1980)].

The existence of a ferroelectric liquid crystal has been first published in 1975 by R.B. Mayer [see J. Phys., Vol. 36, p. 69 (1975)], and the ferroelectric liquid crystal belongs to a chiral smectic C phase, a chiral smectic I phase, a chiral smectic F phase, a chiral smectic G phase, and a chiral smectic H phase (hereinafter simply referred to as "$S_c^*$ phase", "$S_I^*$", "$S_F^*$", "$S_G^*$ phase", and "$S_H^*$ phase", respectively) from the viewpoint of the structure of the liquid crystal.

Many characteristics are required of a ferroelectric liquid crystal material for use in a ferroelectric liquid crystal display element actually utilized in the system. These characteristics requirements cannot be met by use of a single compound, which makes it necessary to use a ferroelectric liquid crystal composition obtained by mixing several liquid crystal compounds or non.liquid crystal compounds.

In addition to the ferroelectric liquid crystal composition consisting of a ferroelectric liquid crystal compound only, Japanese Patent Application Laid-Open No. 195187/1986 discloses that a basic substance composed of a compound and a composition exhibiting a phase such as a nonchiral smectic C, F,G, H, or I phase (hereinafter abbreviated to a "phase such as $S_C$") is mixed with at least one compound exhibiting a ferroelectric liquid crystal phase to prepare a ferroelectric liquid crystal composition as a whole. Further, there is a report that a basic substance composed of a compound and a composition exhibiting a phase such as a nonchiral $S_C$ is mixed with at least one compound exhibiting optical activity but not exhibiting a ferroelectric liquid crystal phase to prepare a ferroelectric liquid crystal composition as a whole [see Mol. Cryst. Liq. Cryst., 89. 327 (1982)].

When all the above facts are put together, it can be understood that a ferroelectric liquid crystal composition can be formed by mixing a basic substance with at least one compound having optical activity independent of whether the compound exhibits a ferroelectric liquid crystal phase.

The above-described smectic liquid crystal mixture comprising a combination of a basic substance exhibiting at least one phase such as non-chiral $S_C$ with at least one phase such as $S_C$ will be hereinafter referred to as the "base Sm mixture".

The base Sm mixture is preferably a liquid crystal mixture exhibiting an $S_C$ phase in a wider temperature range including room temperature from a practical viewpoint. Several of phenylbenzole-based, shiff-based, phenylpyridine-based and 5-alkyl-2-(4-alkoxyphenyl)-pyridine mixtures, etc. have been used as the component of the base Sm mixture. For example, Japanese Patent Application Laid-Open No. 291679/1986 and a pamphlet of PCT International Publication No. W086/06401 each discloses a ferroelectric liquid crystal comprising a mixture of 5-alkyl-2-(4-alkoxyphenyl)-pyrimidine with an optically active compound. The former discloses that use of a ferroelectric ectic liquid crystal material comprising said pyrimidine derivative as a base Sm mixture enables the response time of a light switching element to be shortened. Further, Japanese Patent Application Laid-Open No. 291679/1986 discloses that a ferroelectric liquid crystal material comprising 5-alkyl-2-(4'-alkylbiphenyl-4)pyrimidine, the above-described 5-alkyl-2-(4'-alkoxyphenyl)pyrimidine and an optically active compound is also useful for improving the response characteristics.

However, comparison of the liquid crystal display with other display elements, such as emissive display, has revealed necessity of a further improvement in the response characteristics of the liquid crystal display.

The first object of the present invention is to provide a ferroelectric liquid crystal composition having quick response through a further improvement in the invention described in the above-described Japanese Patent Laid-Open No. 291679/1986.

The second object of the present invention is to provide a light switching element containing said ferroelectric liquid crystal composition.

DISCLOSURE OF INVENTION

The first ferroelectric liquid crystal composition of the present invention is characterized by comprising the following two components A and B and having a component A to component B ratio of 1.5 or less. Component A is at least one compound selected from a compound represented by the following formula:

wherein R1 is an alkyl or alkoxy group of 1 to 18 carbon atoms, X is —CH2O—, —OCH2—, $$-\overset{O}{\underset{\|}{C}}O- \quad \text{or} \quad -O\overset{O}{\underset{\|}{C}}-,$$

m and n are each an integer of 1 or 2 and * is an asymmetric carbon atom; and a compound represented by the following formula:

wherein R2 is a alkyl or alkoxy group of 1 to 18 carbon atoms, Y is —CH2O—, —OCH2—,

$$-\overset{O}{\underset{\|}{C}}O- \quad \text{or} \quad -O\overset{O}{\underset{\|}{C}}-,$$

k and l are each an integer of 1 or 2 and * is an asymmetric carbon atom.

Component B is at least one compound selected from a compound represented by the following formula:

wherein R3 is an alkyl or alkoxy group of 1 to 18 carbon atoms, R4 is an alkyl group of 2 to 18 carbon atoms or an alkoxy group of 1 to 18 carbon atoms and * is an asymmetric carbon atom; and a compound represented by the following formula:

wherein R5 is an alkyl or alkoxy group of 1 to 18 carbon atoms, R6 is an alkyl group of 2 to 18 carbon atoms or an alkoxy group of 1 to 18 carbon atoms and * is an asymmetric carbon atom.

The second composition of the present invention comprises components A and B and further the following component C in such proportions that the amounts of components A, B and C are 10 to 40 % by weight, 10 to 40 % by weight and 10 to 80 % by weight, respectively, based on the total amount of the three components A, B and C.

Component C is at least one compound selected from a compound represented by the following formula:

wherein R7 and R8 which may be the same or different are each an alkyl group of 1 to 18 carbon atoms; and a compound represented by the following formula:

wherein R9 and R10 which may be the same or different are each an alkyl or alkoxy group having 1 to 18 carbon atoms.

The first light switching element of the present invention is an optical switching element containing a ferroelectric liquid crystal composition comprising the above-described two components A and B and having a component A to component B ratio of 1.5 or less.

The second light switching element of the present invention is a light switching element containing the ferroelectric liquid crystal composition comprising the above-described component C in such proportions that the amounts of components A, B and C are 10 to 40 % by weight, 10 to 40 % by weight and 10 to 80 % by weight, respectively, based on the total amount of the three components A, B and C.

Although compounds represented by the formulae (V) and (VI), i.e., component C in the liquid crystal composition and light switching element of the present invention, are each a non-chiral compound, they are very useful as the base Sm mixture because they have a phase such as $S_C$ and very low viscosity. The usefulness of these compounds has been already described by the present inventors in Japanese Patent Application Laid-Open No. 291679/1986, and they are very useful also as a component of the ferroelectric liquid crystal composition intended in the present invention.

The compounds represented by the formulae (I) and (II), i.e., component A of the present invention, are each a ferroelectric liquid crystal compound about which the present applicant has previously filed a patent application (Japanese Patent Application No. 63633/1986). Although these compounds exhibit no significant spontaneous polarization, they are useful as a base liquid crystal compound for a high temperature beacause they have an $S_C^*$ phase in a very high temperature region.

The compounds represented by the formulae (III) and (IV), i.e., component B of the present invention, are each a ferroelectric liquid crystal compound about which a patent application has been previously filed (Japanese Patent Application No. 103977/1986). They exhibit very large spontaneous polarization.

In general, the following relationship exists between the spontaneous polarization value (simply referred to as "Ps"), viscosity (simply referred to as "η") and response time (simply referred to as "τ") of the ferroelectric liquid crystal material:

$$\tau = \frac{\eta}{Ps \cdot E}$$

wherein E is the electric field strength applied to a liquid crystal cell, and a compound having a combination of low viscosity with large spontaneous polarization is desired as the ferroelectric liquid crystal material. Component B plays the above role in the composition intended in the present invention.

The compounds represented by the formulae (V) and (VI), i.e., component C of the present invention, are each a non-chiral compound. The compound represented by the formula (V) has an $S_C$ phase in a low temperature region (e.g., when R7 =C6H13—and R8 =C8H17—, CR 28 $S_C$ 48 $S_A$ 58 N 64 $I_{SO}$). On the other hand, the compound represented by the formula (VI) has an $S_c$ phase in a high temperature region (e.g., when R9 =C7H15—and R10 =C8H17—, Cr 58 $S_C$ 134 $S_A$ 144 N 157 $I_{SO}$). Therefore, a base Sm mixture having an $S_C$ phase over a wide temperature range from a low temperature region to a high temperature region is obtained by combining a compound represented by the formula (V) with a compound represented by the formula (VI). Excellent characteristics of compounds having the above skeleton have been already described by the present inventors in Japanese Patent Application Laid-Open No. 292679/1986. These compounds play as a base $S_C$ compound an important role also in the ferroelectric liquid crystal composition intended in the present invention by virtue of very low viscosity.

The present inventors have made various studies on proportions of individual components which enable formation of an excellent intended liquid crystal composition through utilization of the characteristics of each of components A, B and C, and as a result have found that, as described above, the component A to component B ratio is preferably 1.5 or less and the amounts of components A, B and C are preferably 10 to 40 % by weight, 10 to 40 % by weight and 10 to 80 % by weight, respectively.

Specific examples of component A of the present invention include the following compounds:

Specific examples of component B of the present invention include the following compounds:

Specific examples of component C of the present invention include the following compounds:

(11)

(12)

(13)

(14)

(15)

The characteristic features of the present invention will now be described in more detail with reference to property values in various compositions shown in drawings.

At the offset, a base $S_C$ composition X comprising non-chiral compounds as component C and having the following composition was prepared.

20% by weight

10% by weight

10% by weight

20% by weight

10% by weight

30% by weight

Next, said base $S_C$ composition X was mixed with a compound of the above-described component A or B (the compound will be indicated by the formula number) to prepare the following compositions.

| | | | |
|---|---|---|---|
| Composition a | composition X | (component C) | 80% by weight |
| | compound (3) | (component B) | 20% by weight |
| Composition b | composition X | (component C) | 80% by weight |
| | compound (4) | (component B) | 20% by weight |
| Composition c | composition X | (component C) | 80% by weight |
| | compound (5) | (component B) | 20% by weight |
| Composition d | composition X | (component C) | 80% by weight |
| | compound (6) | (component B) | 20% by weight |
| Composition e | composition X | (component C) | 80% by weight |
| | compound (7) | (component B) | 20% by weight |
| Composition f | composition X | (component C) | 80% by weight |
| | compound (8) | (component B) | 20% by weight |
| Composition g | composition X | (component C) | 80% by weight |
| | compound (9) | (component B) | 20% by weight |
| Composition h | composition X | (component C) | 80% by weight |
| | compound (1) | (component A) | 20% by weight |
| Composition i | composition X | (component C) | 80% by weight |
| | compound (2) | (component A) | 20% by weight |

Further, these compositions were mixed, and the resultant mixtures were subjected to measurement of properties. The results are shown in FIGS. 1 to 6.

Figure 1:
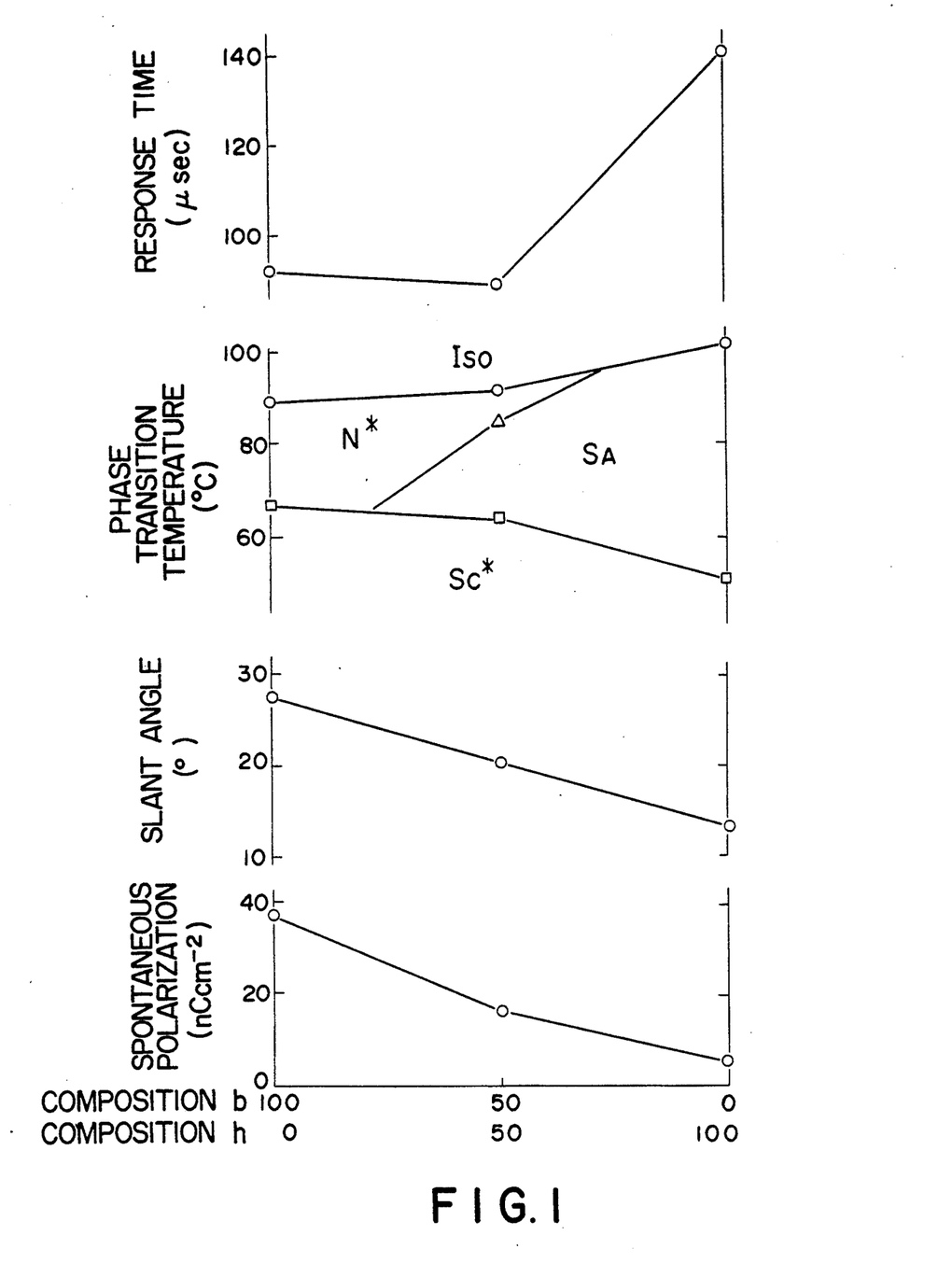
FIGS. 1 to 3 are graphs showing characteristics of a mixture system comprising a composition composed of components B and C and a composition composed of components A and C.
Figure 2:
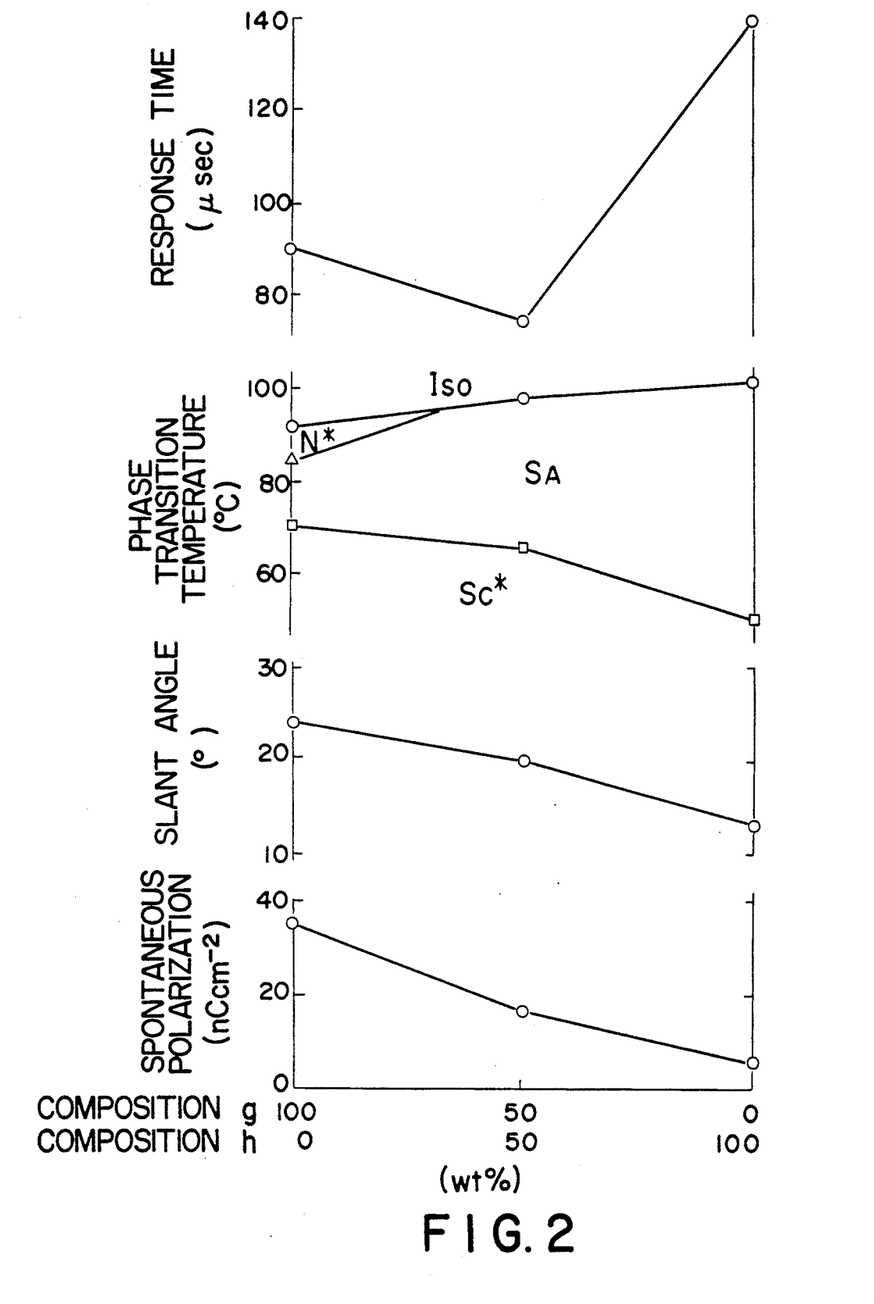

FIG. 1 is a graph showing the temperature dependence of response time, phase transition temperature, spontaneous polarization and tilt angle of a mixture system comprising composition b and composition h; FIG. 2 a graph showing the temperature dependence of the above properties of a mixture system comprising composition g and composition h; and FIG. 3 a graph showing the temperature dependence of the above properties of a mixture system comprising composition b and composition i. The response time, spontaneous polarization and tilt angle were measured at 25° C., and the electric field strength was 5 MV/m during measurement of the response time.

In FIG. 1, the response time of a composition comprising composition b and composition h in a composition b to composition h mixing ratio of 50 : 50 is smaller than that of a composition h comprising components A and C or a composition b comprising components B and C. Similar results are obtained also in FIG. 2 and 3. From these results, it is apparent that the composition of the present invention comprising components A, B and C exhibits superior response time.

For example, in FIG. 2, when compositions respectively having g : h = 100 : 0, 50 : 50 and 0 : 100 ( % by weight) are compared with each other, the response time is 90 μsec in the case of g : h = 100 : 0 and 140 μsec in the case of g : h = 0 : 100 while the composition having g : h = 50 : 50 exhibits a response time of 75 μsec, i.e., very excellent quick response characteristics. Thus, presence of component A can shorten the response time. This can be seen also from FIGS. 1 and 3.

Figure 3:
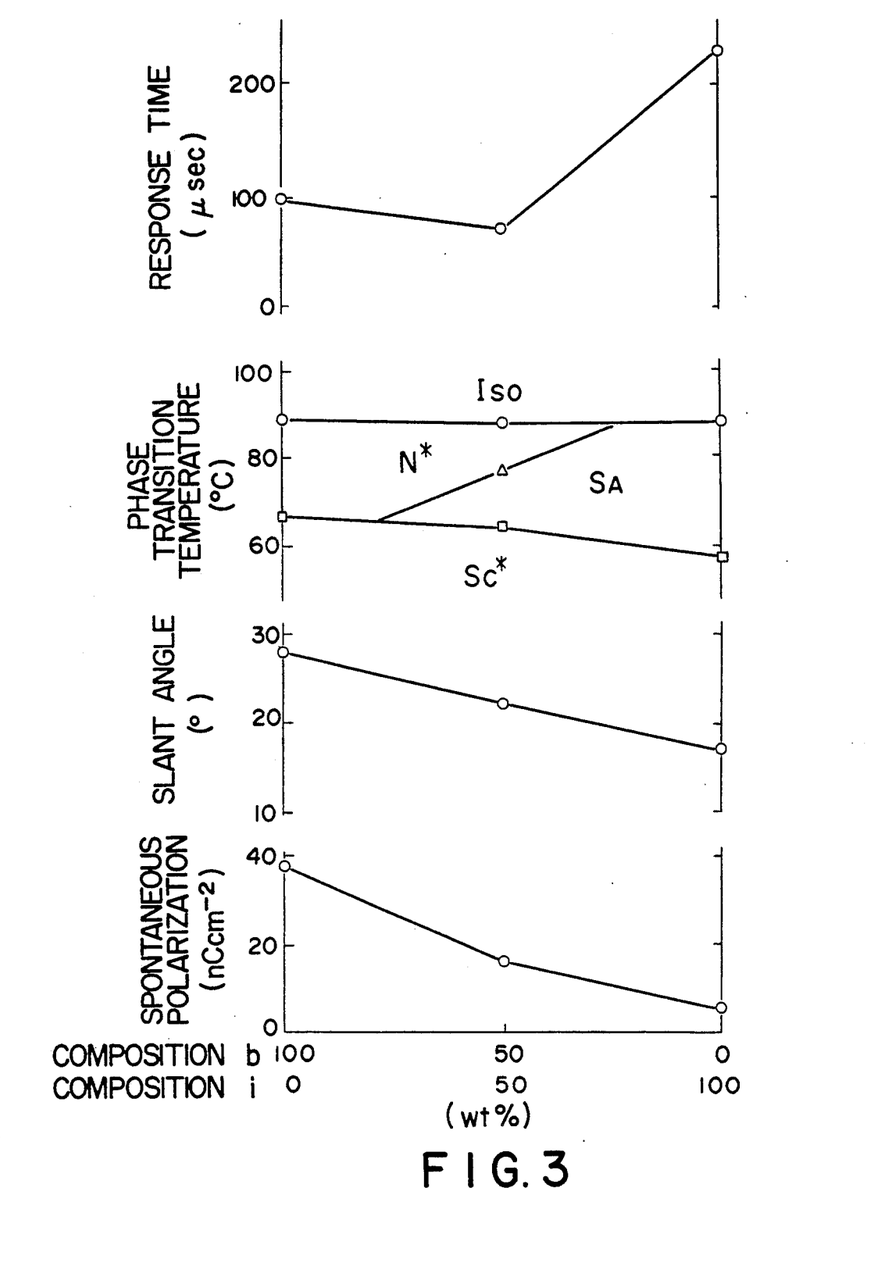

In FIGS. 1 to 3, each combination of compositions will now be described in more detail. When the composition ratio is 50 : 50 (% by weight), there occurs no significant lowering in the upper limit temperature of the $S_C^*$ phase, which indicates excellent compatibility of component A with component B. A characteristic relationship is observed between the Ps value and the tilt angle. In each of a mixture system comprising compositions b and h (FIG. 1), a mixture system comprising compositions g and h (FIG. 2) and a mixture system comprising compositions b and i (FIG. 3), component B appears to be a major component responsible for the term Ps. However, it can be seen that the Ps value in a 50 : 50 composition tends to decrease under an influence of component A which is a component having a small Ps value. For example, in FIG. 1, the Ps values of a composition having b : h = 100 : 0 (% by weight) and a composition having b : h = 0 : 100 (% by weight) are 37 nCcm$^{-2}$ and 5 nCcm$^{-2}$, respectively, while the Ps value of a composition having b : h = 50 : 50 (% by weight) is 18 nCcm$^{-2}$, i.e, smaller than the expected value.

For the tilt angle, e.g., in FIG. 1, the tilt angles of a composition having b : h = 100 : 0 (% by weight) and a composition having b : h = 0 : 100 (% by weight) are 27° and 13°, respectively, while the tilt angle of composition having b : h = 50 : 50 (% by weight) is 20°, i.e, an arithmetic mean value of both values. It is a common knowledge that a smaller tilt angle brings about a shorter response time. However, when all the above facts are put together, it cannot be said that a reduction in the response time in the case of a 50 : 50 (% by weight) composition is merely derived from a reduction in the tilt angle. From FIGS. 1 to 3, it is apparent that the tilt angle value in a 50 : 50 (% by weight) composition is rather positively maintained than reduced. By contrast, the Ps value tends to positively reduce. Therefore, when the above-described expression of relationship between the response time ($\tau$), viscosity ($\eta$) and spontaneous polarization $$\tau = \frac{\eta}{Ps \cdot E}$$

(Ps) is taken into consideration, in a mixture system comprising components A and B, mixing of component A with component B brings about a positive reduction in the $\eta$ value rather than the Ps value, so that shortening of $\tau$ is realized.

For the ratio of component A to component B, the best results can be obtained when the ratio of component A to component B is 1 : 1. However, when the response time is taken into consideration, the ratio of component A to component B is preferably 1.5 or less. Further, for preferable proportions of components A, B and C, it can be understood that the amounts of components A, B and C are preferably 10 to 40 % by weight, 10 to 40 % by weight and 10 to 80 % by weight, respectively.

Figure 4:
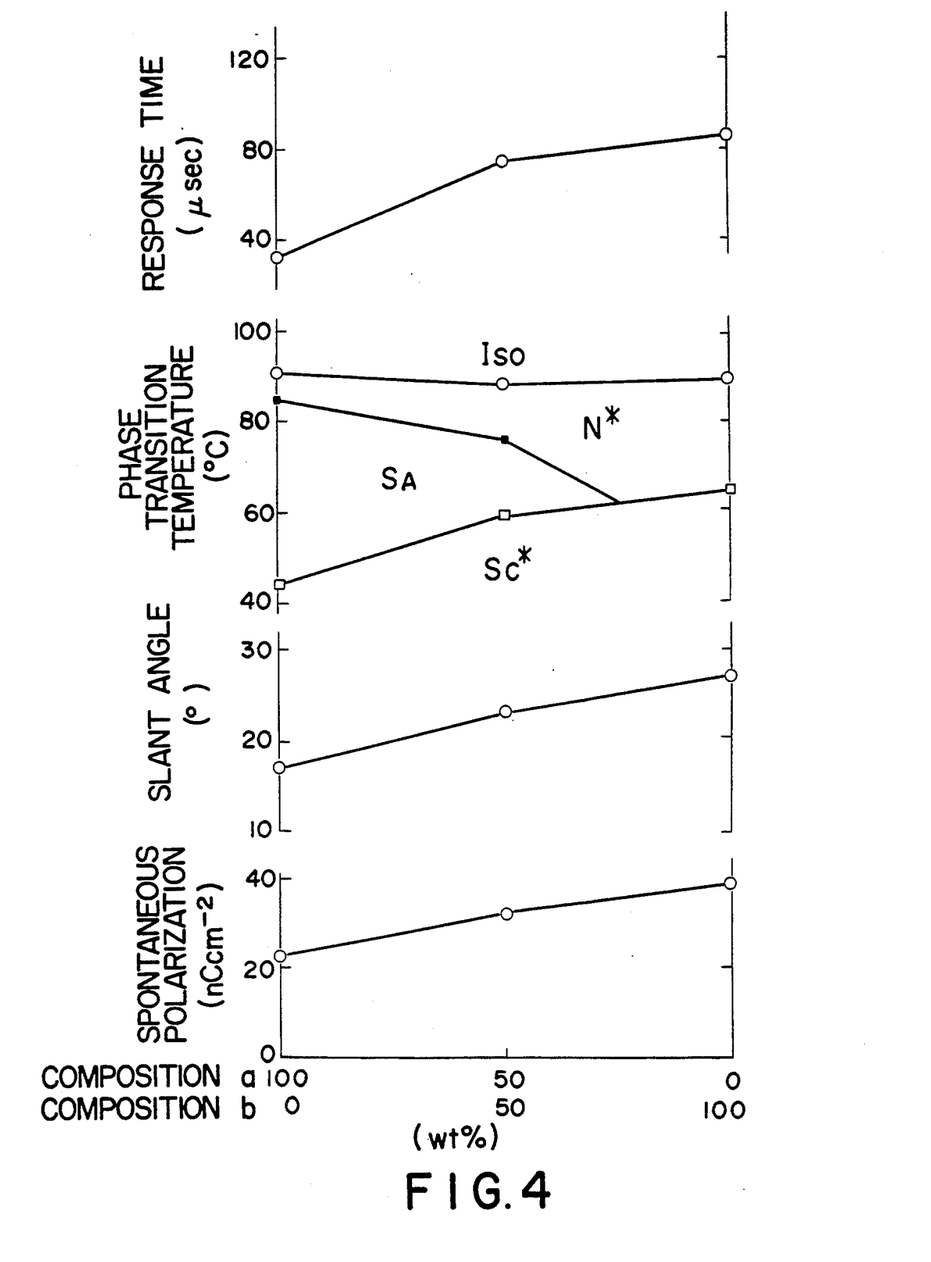
FIGS. 4 to 6 are graphs showing characteristics of compositions each comprising components B and C and different in the composition ratio.
Figure 5:
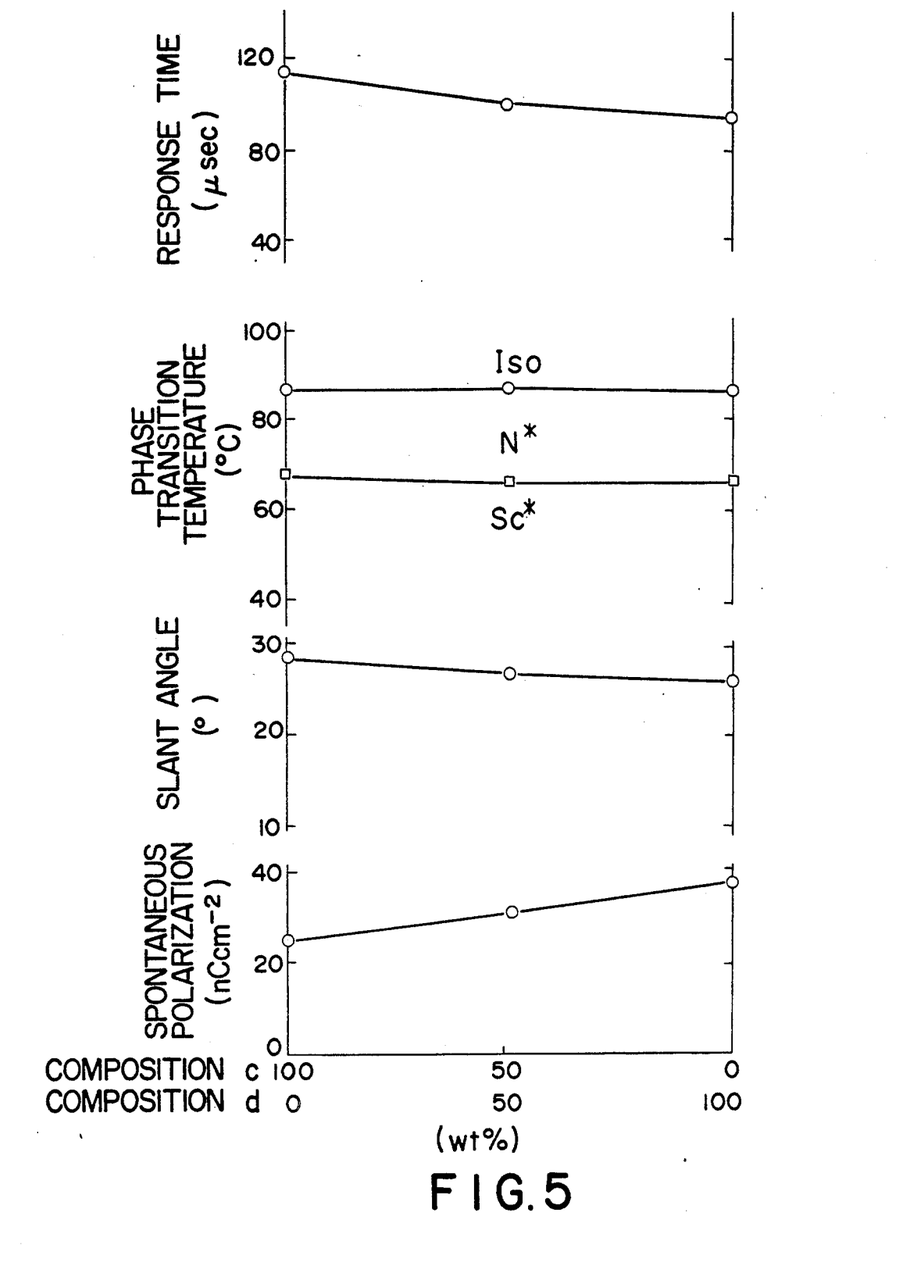
Figure 6:
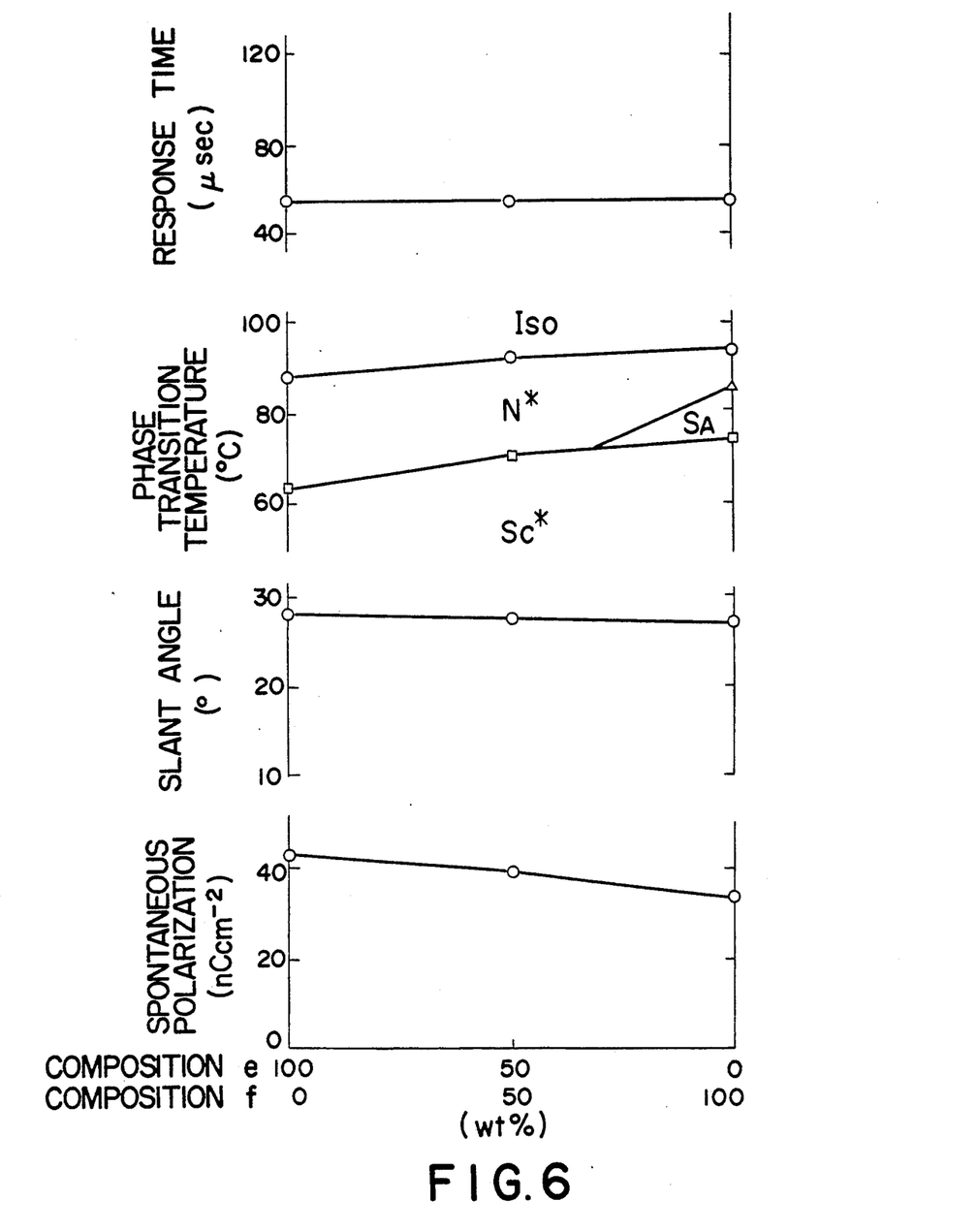

FIGS. 4 to 6 are each a graph showing the concentration dependence of response time, phase transition temperature, tilt angle and spontaneous polarization of binary mixture systems, i.e., a mixture system comprising compositions a and b, a mixture system comprising compositions c and d, a mixture system comprising compositions e and f. The response time, spontaneous polarization and tilt angle were measured at 25° C., and the electric field strength was 5 MV/m during measurement of the response time.

As is apparent from FIGS. 4 to 6, in binary mixture systems, i.e., a mixture system comprising compositions a and b, a mixture system comprising compositions c and d, a mixture system comprising compositions e and f, a simple arithmetic means relationship is established for the response time, spontaneous polarization or tilt angle. However, in the above-described mixture systems (FIGS. 1 to 3) each comprising compositions containing a component A compound, a significant effect can be attained for the response time. This substantiates that the composition of the present invention is superior.

Various measurements in the present invention were conducted by the following methods.

The spontaneous polarization value (Ps) was measured by the Sawyer Tower method. In the measurement of the tilt angle (θ), a sufficiently high electric field above a critical electric field was applied to a homogeneously aligned cell to bring about disappearance of a helical structure, the polarity was reversed, and the tilt angle was determined from the travel angle (corresponding to 2θ) of extinction position under crossed-nicols.

The response time was measured by injecting each composition into a cell subjected to alignment treatment and having an electrode-to-electrode distance of 2 μm, applying a rectangular wave of 1 kHz having a peak-to-peak voltage $V_{pp}$ of 20 V and determining a change in the transmitted light intensity.

BEST MODE FOR CARRYING OUT THE INVENTION

The present invention will now be described in more detail by way of Examples. However, the present invention is not limited to these Examples only.

Examples 1 to 5

Ferroelectric liquid crystal compositions were prepared according to Table 1. The characteristics of each product were measured, and the results are shown in Table 2. Numerals below Example numbers in Table 1 represent % by weight. Numerals below phase symbols in Table 2 represent the phase transition temperature (°C.).

TABLE 1

| Component | Formula | Compound | Ex. No. 1 | 2 | 3 | 4 | 5 |
|---|---|---|---|---|---|---|---|
| A | I | $C_{10}H_{21}O$–⟨⟩–⟨⟩–$OCH_2$–⟨⟩–$CO$–O–*CH($CH_3$)–$C_6H_{13}$ (S) | 10 | 20 | 10 | | |
| A | I | $C_8H_{17}$–⟨⟩–⟨⟩–$OCH_2$–⟨⟩–$CO$–O–*CH($CH_3$)–$C_6H_{13}$ (S) | | | | | 10 |
| A | II | $C_9H_{19}$–⟨⟩–⟨⟩–$CH_2O$–⟨⟩–O–*CH($CH_3$)–$C_6H_{13}$ (S) | | | | 25 | |
| B | III | $C_5H_{11}$–⟨⟩–⟨pyrimidine⟩–O–$CH_2$–*CH($CH_3$)–O–CO–*CH($CH_3$)–$OC_4H_9$ (S,S) | | 20 | 15 | | |
| B | IV | $C_7H_{15}$–⟨pyridine⟩–⟨⟩–O–$CH_2$–*CH($CH_3$)–O–CO–*CH($CH_3$)–$OC_4H_9$ (S,S) | 10 | | | | |
| B | IV | $C_7H_{15}$–⟨pyridine⟩–⟨⟩–O–$CH_2$–*CH($CH_3$)–O–CO–*CH($CH_3$)–$C_2H_5$ (S,S) | | | | 10 | 20 |
| C | V | $C_6H_{13}O$–⟨⟩–⟨pyrimidine⟩–$C_8H_{17}$ | 24 | 18 | 24 | 18 | 21 |
| C | V | $C_8H_{17}O$–⟨⟩–⟨pyrimidine⟩–$C_8H_{17}$ | 16 | 12 | 16 | 12 | 14 |
| C | V | $C_9H_{19}O$–⟨⟩–⟨pyrimidine⟩–$C_8H_{17}$ | 8 | 6 | 8 | 6 | 7 |
| C | V | $C_{10}H_{21}O$–⟨⟩–⟨pyrimidine⟩–$C_8H_{17}$ | 8 | 6 | 8 | 6 | 7 |
| C | VI | $C_5H_{11}$–⟨⟩–⟨⟩–⟨pyridine⟩–$C_8H_{17}$ | 16 | 12 | 16 | 12 | 14 |

TABLE 1-continued

| Component | Formula | Compound | Ex. No. 1 | 2 | 3 | 4 | 5 |
|---|---|---|---|---|---|---|---|
| C | VI |  | 8 | 6 | 8 | 6 | 7 |

TABLE 2

| | | Cr | $S_C^*$ | $S_A$ | N* | $I_{SO}$ | Spontaneous po-** larization (nCcm$^{-2}$) | Tilt** angle (°C.) | Response** time (μsec) |
|---|---|---|---|---|---|---|---|---|---|
| Ex. No. | 1 | ·—7.0 | ·66.0 | ·98.2 | | · | 19.4 | 20.0 | 75 |
| | 2 | ·—10.0 | ·70.0 | ·86.3 | ·91.6 | · | 38.4 | 21.0 | 77 |
| | 3 | ·—5.0 | ·76.0 | ·105.0 | | · | 11.3 | 21.5 | 42 |
| | 4 | ·—3.0 | ·63.0 | ·77.1 | ·86.8 | · | 28.7 | 21.9 | 68 |
| | 5 | ·—2.7 | ·75.0 | ·105.0 | | · | 28.0 | 21.0 | 70 |

**value at 25° C.

INDUSTRIAL APPLICABILITY

The ferroelectric liquid crystal composition of the present invention exhibits quick response when used in a display system wherein the light switching phenomenon of this liquid crystal is utilized. Therefore, it can be used as a material for a light switching element to prepare an excellent liquid crystal display element wherein characteristics of a liquid crystal display element, such as non-emissive type and small power comsumption, are utilized with an improvement in the drawback of the liquid crystal display element, i.e., poor response characteristics.

What is claimed is:

1. A ferroelectric liquid crystal composition, characterized by comprising two components A and B and having a ratio of component A to component B of 1.5 or less, said component A being at least one compound selected from a compound represented by the following formula:

(I)

wherein R1 is an alkyl or alkoxy group of 1 to 18 carbon atoms, X is —CH2O—, —OCH2, and are each an integer of 1 or 2 and * is an asymmetric carbon atom; and a compound represented by the following formula:

(II)

wherein R2 is an alkyl or alkoxy group of 1 to 18 carbon atoms, Y is —CH2O—, —OCH2—, k and l are each an integer of 1 or 2 and * is an asymmetric carbon atom and said component B being at least one compound selected from a compound represented by the following formula:

(III)

wherein R3 is an alkyl or alkoxy group of 1 to 18 carbon atoms, R4 is an alkyl group of 2 to 18 carbon atoms or an alkoxy group of 1 to 18 carbon atoms and * is an asymmetric carbon atom; and a compound represented by the following formula:

(IV)

wherein R5 is an alkyl or alkoxy group of 1 to 18 carbon atoms, R6 is an alkyl group of 2 to 18 carbon atoms or an alkoxy group of 1 to 18 carbon atoms and * is an asynmetric carbon atom.

2. A ferroelectric liquid crystal composition according to claim 1, wherein said component A is at least, one compound selected from the group consisting of the following compounds:

(S)

-continued

3. A ferroelectric liquid crystal composition according to claim 1, wherein said component B is at least one compound selected from the group consisting of the following compounds:

4. A ferroelectric liquid crystal composition according to claim 1, which further comprises following component C besides said components A and B and the amounts of said components A, B and C are 10 to 40 % by weight, 10 to 40 % by weight and 10 to 80 % by weight, respectively, based on the total amount of the three components A, B and C;
said component C being at least one compound selected from a compound represented by the following formula:

wherein R7 and R8 which may be the same or different are each an alkyl group of 1 to 18 carbon atoms; and a compound represented by the following formula:

wherein R9 or R10 which may be the same or different are each an alkyl or alkoxy group of 1 to 18 carbon atoms.

5. A ferroelectric liquid crystal composition according to claim 4, wherein said component C is at least one compound selected from the group consisting of the following compounds:

-continued

6. A light switching element comprising a ferroelectric liquid crystal composition comprised of two components A and B and having a component A to component B ratio of 1.5 or less, said component A being at least one compound selected from a compound represented by the following formula:

(I)

wherein R1 is an alkyl or alkoxy group of 1 to 18 carbon atoms, X is —CH2O—, —OCH2—, m and n are each an integer of 1 or 2 and * is an asymmetric carbon atom; and a compound represented by the following formula:

(II)

wherein R2 is an alkyl or alkoxy group of 1 to 18 carbon atoms, Y is —C H2O—, —OCHhd 2—, k and l are each an integer of 1 or 2 and * is an asymmetric carbon atom and said component B being at least one compound selected from a compound represented by the following formula:

(III)

wherein R3 is an alkyl or alkoxy group of 1 to 18 carbon atoms, R4 is an alkyl group of 2 to 18 carbon atoms or an alkoxy group of 1 to 18 carbon atoms and * is an asymmetric carbon atom; and a compound represented by the following formula:

(IV)

wherein R5 is an alkyl or alkoxy group of 1 to 18 carbon atoms, R6 is an alkyl group of 2 to 18 carbon atoms or an alkoxy group of 1 to 18 carbon atoms and * is an asymmetric carbon atom.

7. A light switching element according to claim 6, wherein said ferroelectric liquid crystal composition further comprises component C and has a component A to component B ratio of 1.5 or less and the amounts of said components A, B and C are 10 to 40 % by weight, 10 to 40 % by weight and 10 to 80 % by weight, respectively, based on the total amount of the three components A, B and C, said component C being at least one compound selected from a compound represented by the following formula:

(V)

wherein R7 and R8 which may be the same or different are each an alkyl group of 1 to 18 carbon atoms; and a compound represented by the following formula:

(VI)

wherein R9 and R which may be the same or different are each an alkyl or alkoxy group of 1 to 18 carbon atoms.

* * * * *

UNITED STATES PATENT AND TRADEMARK OFFICE
CERTIFICATE OF CORRECTION

PATENT NO. : 5,021,190

DATED : June 4, 1991

INVENTOR(S) : Kikuchi et al

Page 1 of 2

It is certified that error appears in the above-identified patent and that said Letters Patent is hereby corrected as shown below:

In item [57] Abstract, line 22, after "-OCH$_2$-" insert
$$--\overset{O}{\underset{\|}{-CO-}} \text{ or } \overset{O}{\underset{\|}{-OC-}}, --.$$

```
Column 13, claim 1, line 51, change "R1" to --R¹--;
                    line 52, change "CH2O" to --CH₂O--;
                             change "OCH2" to --OCH₂--;
                    line 56, change "and are" to
                                     --m and n are--;
                    line 66, change "R2" to --R²--;
                    line 67, change "CH2O" to --CH₂O--;
                             change "OCH2" to --OCH₂--;
Column 14, claim 1, line 41, change "R3" to --R³--;
                    line 42, change "R4" to --R⁴--;
                    line 55, change "R5" to --R⁵--;
                    line 56, change "R6" to --R⁶--;
                    line 58, change "asymetric" to
                                     --asymmetric--;
Column 14, claim 2, line 60, delete "," (second occurrence);
Column 16, claim 4, line 1, change "R7" to --R⁷--;
                             change "R8" to --R⁸--;
                    line 11, change "R9 or R10" to
                                     --R⁹ and R¹⁰--;
Column 17, claim 6, line 24, change "comprisinq" to
                                     --comprising--;
                    line 38, change "R1" to --R¹--;
                    line 39, change "CH2O" to --CH₂O--;
                             change "OCH2" to --OCH₂--;
                    line 55, change "R2" to --R²--;
                    line 56, change "C H2O" to --CH₂O--;
                             change "OCHhd 2" to --OCH₂--;
```

UNITED STATES PATENT AND TRADEMARK OFFICE
CERTIFICATE OF CORRECTION

PATENT NO. : 5,021,190

DATED : June 4, 1991

INVENTOR(S) : Kikuchi et al

It is certified that error appears in the above-identified patent and that said Letters Patent is hereby corrected as shown below:

```
Column 18, claim 6, line 14, change "R3" to --$R^3$--;
                    line 15, change "R4" to --$R^4$--;
                    line 28, change "R5" to --$R^5$--;
                    line 29, change "R6" to --$R^6$--;
Column 18, claim 7, line 50, change "R7" to --$R^7$--;
                             change "R8" to --$R^8$--;
                    line 61, change "R9" to --$R^9$--;
                             change "R"  to --$R^{10}$--.
```

Signed and Sealed this

Twelfth Day of January, 1993

Attest:

DOUGLAS B. COMER

Attesting Officer — Acting Commissioner of Patents and Trademarks